Oct. 12, 1948.  E. M. BUTLER  2,451,064
ELECTROLYTIC WATER CORRECTION DEVICE
Filed May 3, 1946
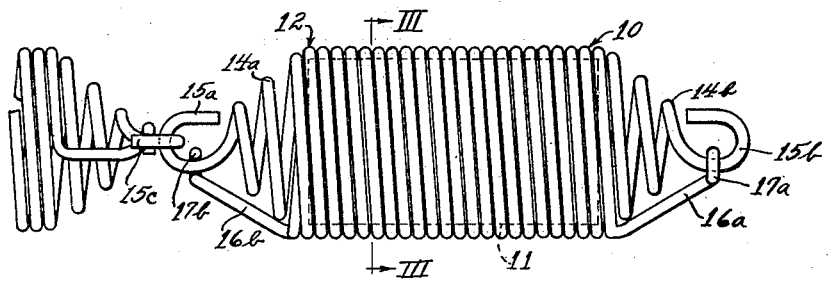
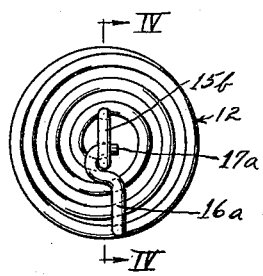 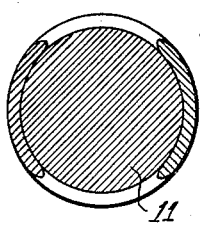
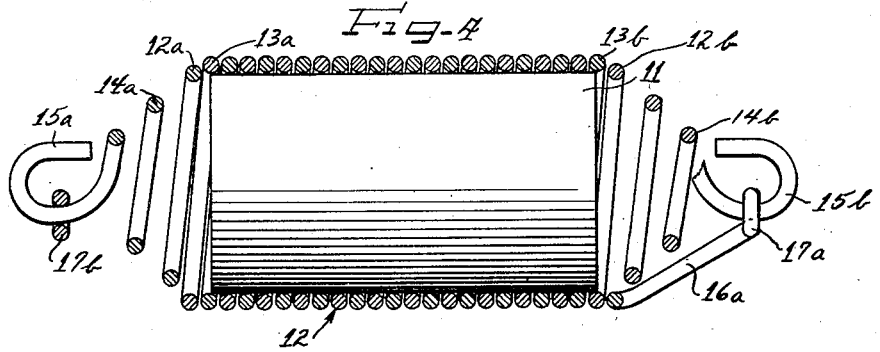
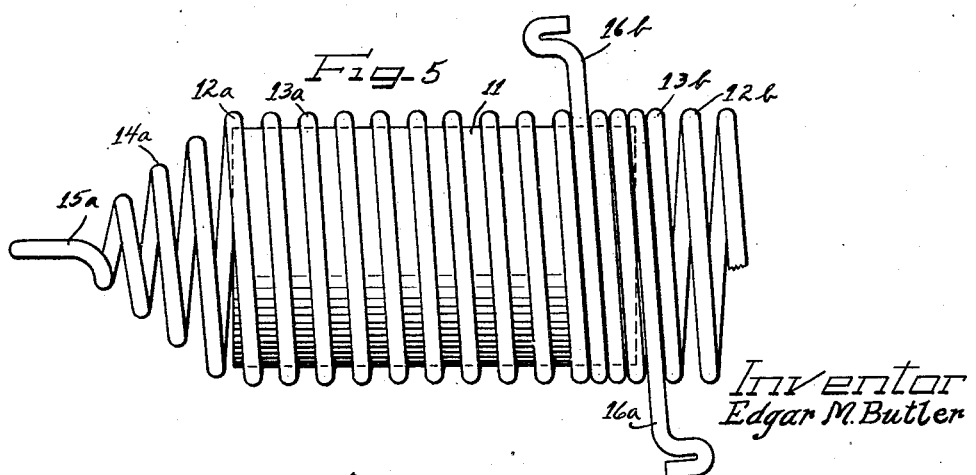
Inventor
Edgar M. Butler Patented Oct. 12, 1948

2,451,064

UNITED STATES PATENT OFFICE 2,451,064

ELECTROLYTIC WATER CORRECTION DEVICE

Edgar M. Butler, New Orleans, La.

Application May 3, 1946, Serial No. 666,901

7 Claims. (Cl. 204—248)

This invention relates to an electrolytic water correction device and to a method of making the same. More particularly, the invention relates to an electrolytic water correction device comprising a core of negative metal, such as zinc, and a coiled wire sheath therefor formed of a positive metal, or coated with a positive metal, and completely enclosing the core while permitting access to the core of the water in which the device is intended to be submerged.

In accordance with the principles of my present invention, a solid core, preferably cylindrical in shape, forms the negative element, and a multipart coiled wire sheath forms the positive element. The sheath is formed in two identical sections, each having cylindrical portions of helically coiled wire for threading one upon the other to enclose the cylindrical core, and having reduced end portions terminating in hooks for suspending the device or for attachment to similar devices in multiple. An end from one of the cylindrical portions is bent inwardly for engagement with the suspending hook of the other cylindrical portion so as to prevent separation accidentally of the two sections.

One of the advantages of this construction is that the resiliency of the coiled sections allows for expansion of the core metal, which takes place during its disintegration, while at the same time preventing the dislodgment of any substantial chunk of the core from within the enclosing sheath. As the metal of the core is used up, the coiled wire sheath continues to tightly engage the core and provide good electrical contact therewith for the setting up of galvanic action.

It is therefore an important object of this invention to provide an electrolytic water correction device in which the core is accommodatingly sheathed in a multi-part cage formed of helically coiled wire, the resiliency of which compensates for expansion or contraction of the core during use.

It is a further important object of this invention to provide a coiled metal sheath made in two parts, which are capable of being threaded one upon the other to provide a complete enclosure for a cartridge of a metal that is electro-negative to the metal of which the sheath is formed.

It is a still further important object of this invention to provide a coiled wire sheath for a negative metal cartridge of such construction as to be readily assembled in place and held against accidental separation, while at the same time providing for the multiple linking of other similar devices therewith.

It is a further important object of this invention to provide a method of making an electrolytic water correction device in accordance with which identical sections of coiled wire enclosures are provided with open ended cylindrical portions for threading one upon the other to enclose a core of negative metal with good electrical contact therebetween and to provide interlocking means for preventing accidental separation of the sheath sections after assembly on the core.

Other and further important objects of this invention will be apparent from the disclosures in the specification and on the accompanying drawings.

On the drawings:

Figure 1 is an elevational view of a device embodying the principles of my invention, illustrating in a fragmentary way the union of a plurality of such devices.

Figure 2 is an end elevational view of the device.

Figure 3 is a sectional view taken substantially on the line III—III of Figure 1.

Figure 4 is a sectional view taken substantially on the line IV—IV of Figure 2 with the core in elevation.

Figure 5 is an elevational view illustrating the method of assembly of the multi-part coiled wire sheath.

As shown on the drawings:

The reference numeral 10 indicates generally a device embodying the principles of my invention. Said device 10 comprises a cylindrical core, or cartridge, 11, which may be a solid bar of zinc, or other negative metal. A sheath, indicated generally by the reference numeral 12 is mounted upon said bar 11 and encloses the same.

Said sheath 12 comprises two sections 12a and 12b, which are in every respect identical. Each of said sections 12a and 12b is formed of a plurality of turns of helically coiled wire of circular cross section and comprises a cylindrical portion 13a and 13b, respectively, and a reduced diameter end portion 14a and 14b, respectively. The reduced diameter end portions terminate in hooks 15a and 15b, respectively. As illustrated in Figure 1, a hooked end 15a may be engaged with the hooked end 15c of another similar device where it is desirable to position the devices in multiple.

The open end of each of the cylindrical portions 13a and 13b terminates in an inwardly bent length of wire 16a or 16b which may be bent around the adjacent hook 15b or 15a, as at 17a and 17b, respectively. In this way the two sections are prevented from being accidentally separated.

As illustrated in Figure 5, the core 11 is first inserted into the open cylindrical end of one of the sheath sections, such as the sheath section 12a. At this stage, the end length of wire 16a extends laterally from the cylindrical portion 13a. The cylindrical portion 13b of the other section is then threaded over the cylindrical portion 13a by a relative turning movement, the outwardly extending end portion 16b in no way interfering with this threading operation. After the cylindrical portion 13b has been completely threaded upon the cylindrical portion 13a, the end portions 16a and 16b are bent inwardly to engage the hook ends 17a and 17b about the hook ends 15b and 15a, respectively, thereby interlocking the two sections and preventing their accidental separation. The cartridge or core 11 is now completely enclosed within the assembled sheath 12 and is ready for use.

Owing to the resiliency of the helical coil of the cylindrical portions 13a and 13b, the cylindrical core 11 is at all times tightly engaged by and enclosed within the sheath 12, despite such expansion or contraction as may take place during the use of the device in the heated water of a boiler, or the like. Good electrical contact is maintained between the sheath and the cartridge at all times, insuring an effective galvanic action for the dissolution of the negative metal of the cartridge. This action is explained in my issued Patents Nos. 2,321,796, 2,321,797 and 2,348,882.

The term "positive" as used herein designates metals positioned below hydrogen in the electromotive force series of metals. The term "negative" as used herein designates metals positioned above hydrogen in the electromotive force series of metals.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of making an electrolytic water correction device, which comprises forming a cylindrical bar of a negative metal of the electromotive force series, forming identical sections of coiled wire of a positive metal of the electromotive force series having open-ended cylindrical portions of about the diameter of said bar and having reduced end portions, inserting said bar into an open-ended cylindrical portion of one section and threading the open-ended cylindrical portion of the other section over the cylindrical portion of the first section to enclose said bar.

2. The method of making an electrolytic water correction device, which comprises forming a cylindrical bar of a negative metal of the electromotive force series, forming identical sections of coiled wire of a positive metal of the electromotive force series having open-ended cylindrical portions of about the diameter of said bar and having reduced end portions, inserting said bar into an open-ended cylindrical portion of one section, threading the open-ended cylindrical portion of the other section over the cylindrical portion of the first section to enclose said bar and bending an end of one cylindrical section inwardly to interengage a reduced end portion of the other section to hold said sections against separation.

3. In an electrolytic water correction device, a core, a coiled wire sheath of positive metal of the electromotive force series for receiving therein the core of negative metal of the electromotive force series, said sheath comprising a pair of separate coiled sections, each having an open end for receiving the core and a partially closed end, the open ends of the sections being interthreaded to enclose the core therein, the partially closed ends being at opposite ends of the core and serving to hold the core within the sheath.

4. An electrolytic water correction device comprising a core of a negative metal of the electromotive force series, and a coiled wire sheath of a positive metal of the electromotive force series, said sheath consisting of two complementary cylindrical sections of helically coiled wire, each of said sections being open at one end and having turns of decreasing diameter at the other end, the sections being interthreaded along their cylindrical lengths with the end turns of decreasing diameter enclosing the ends of said core to retain the same within said sheath.

5. An electrolytic water correction device comprising a core of a negative metal of the electromotive force series and a coiled wire sheath of a positive metal of the electromotive force series enclosing said core, said sheath being formed of two separate sections, each of said sections being open at one end and partially closed at the other end, said sections being interthreaded with their partially closed ends lying at opposite ends of said core to retain the same within said sheath.

6. An electrolytic water correction device comprising a cylindrical core of a negative metal of the electromotive force series and a coiled wire sheath of a positive metal of the electromotive force series enclosing said core, said sheath comprising identical helical coils of wire having interthreaded cylindrical portions tightly engaging said core, each of said cylindrical portions having an open end and an end of reduced diameter terminating in a hook, said ends of reduced diameter lying at opposite ends of said core and there being integral end portions from the open end of each coil interlocked with the end hook of the other coil.

7. An electrolytic water correction device comprising a cylindrical core of a negative metal of the electromotive force series and a coiled wire sheath of a positive metal of the electromotive force series tightly coiled upon said core and enclosing the same, said sheath comprising identical sections of helical coils of wire having interthreaded cylindrical portions tightly engaging said core, each of said sections having an end of reduced diameter terminating in a supporting hook and having at the opposite end an inwardly bent offset end, the reduced diameter ends of said sections lying at opposite ends of said core and the inwardly bent offset end of one section being hooked about the supporting hook of the other section.

EDGAR M. BUTLER.

REFERENCES CITED

The following references are of record in the file of this patent:

UNITED STATES PATENTS

| Number | Name | Date |
| --- | --- | --- |
| 577,134 | Harrison | Feb. 16, 1897 |
| 1,034,711 | Ives | Aug. 6, 1912 |